(12) United States Patent
M R et al.

(10) Patent No.: US 10,157,350 B2
(45) Date of Patent: Dec. 18, 2018

(54) CONTEXT BASED CONVERSATION SYSTEM

(71) Applicant: TATA CONSULTANCY SERVICES LIMITED, Mumbai (IN)

(72) Inventors: Sumesh M R, Kochi (IN); Anju Paul, Kochi (IN); Neethu Manuel, Kochi (IN); Sibimon Sasidharan, Kochi (IN); Keerthi Damaraju, Mumbai (IN); Viju Chacko, Kochi (IN); Shampa Sarkar, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 234 days.

(21) Appl. No.: 14/841,213

(22) Filed: Aug. 31, 2015

(65) Prior Publication Data

US 2016/0283463 A1 Sep. 29, 2016

(30) Foreign Application Priority Data

Mar. 26, 2015 (IN) .......................... 1031/MUM/2015

(51) Int. Cl.
*G06F 17/27* (2006.01)
*G06N 99/00* (2010.01)
*G06F 17/30* (2006.01)

(52) U.S. Cl.
CPC ....... *G06N 99/005* (2013.01); *G06F 17/2785* (2013.01); *G06F 17/30401* (2013.01); *G06F 17/30976* (2013.01)

(58) Field of Classification Search
CPC ...................................................... G06F 17/27
USPC ............................................. 704/9, 233, 235
See application file for complete search history.

(56) References Cited

U.S. PATENT DOCUMENTS

| | | | | |
|---|---|---|---|---|
| 5,970,490 A | * | 10/1999 | Morgenstern | ..... G06F 17/30569 |
| 6,510,531 B1 | * | 1/2003 | Gibbons | ............ G06F 11/3672 |
| | | | | 707/999.007 |
| 6,754,699 B2 | * | 6/2004 | Swildens | ................ G06F 9/505 |
| | | | | 370/229 |
| 8,090,877 B2 | * | 1/2012 | Agarwal | ............. H04L 63/0281 |
| | | | | 709/219 |
| 9,021,386 B1 | * | 4/2015 | Rasmussen | ............. G06F 3/002 |
| | | | | 715/785 |
| 9,548,935 B2 | * | 1/2017 | Short | ...................... H04L 63/08 |

(Continued)

*Primary Examiner* — Michael Colucci
(74) *Attorney, Agent, or Firm* — Seed IP Law Group LLP

(57) ABSTRACT

Method(s) and system(s) providing for providing context based conversations are described here. The method may include receiving user data pertaining to a user. The user data includes registration information of the user and metadata associated with the user. The method may include determining a pre-defined role of the user based on the registration information. Further, the method may include providing restricted access to a users' data repository to the user, based on the role of the user. The method includes obtaining a text input pertaining to a conversation. Based on the text input an expression is generated. Further, one of a discussion service, a learning service, and an unlearning service is invoked, based on the expression and the metadata associated with the user. Based on at least one of the invoking services and the metadata associated with the user, retrieving a response. The response is shared with the user.

20 Claims, 7 Drawing Sheets

(56) References Cited

U.S. PATENT DOCUMENTS

| | | | |
|---|---|---|---|
| 2005/0154580 A1* | 7/2005 | Horowitz | G06F 17/271 704/9 |
| 2006/0080432 A1* | 4/2006 | Spataro | H04L 12/1831 709/224 |
| 2011/0066634 A1* | 3/2011 | Phillips | G10L 15/22 707/769 |
| 2012/0280783 A1* | 11/2012 | Gerhardt | G07C 9/00309 340/5.6 |
| 2013/0143587 A1* | 6/2013 | Williams | H04W 4/023 455/456.1 |
| 2013/0346877 A1* | 12/2013 | Borovoy | H04L 65/403 715/753 |
| 2014/0180677 A1* | 6/2014 | McCaffrey | G06F 17/30654 704/9 |
| 2015/0120718 A1* | 4/2015 | Luo | G06F 17/30699 707/728 |
| 2016/0157782 A1* | 6/2016 | Kumar | A61B 5/6897 600/301 |

\* cited by examiner

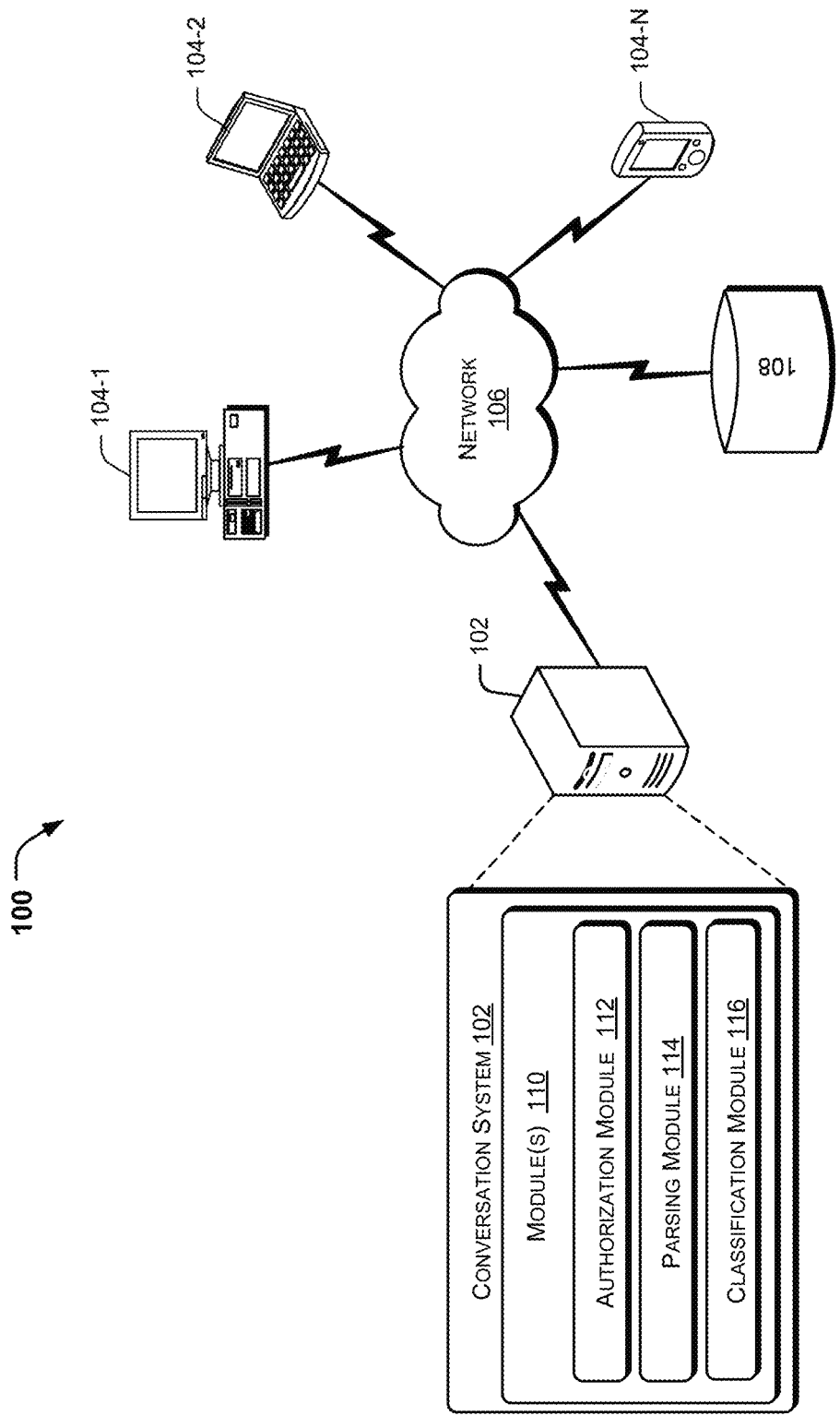

CONTEXT BASED CONVERSATION SYSTEM

TECHNICAL FIELD

The present subject matter relates to conversation systems and, particularly but not exclusively, to context based conversation systems.

BACKGROUND

Conversation systems allow users to converse with computer systems. In order to assist a user with such conversation, some conversation systems employ query recommendation. Conversation systems have employed text, speech, graphics, gestures, and other modes for communication on both the input and output channel. Further, Artificial Intelligence (AI) based conversation system have been deployed by many enterprises in their business environments to reduce operational cost. An AI based conversation system facilitates the users to engage in a two-way communication with an artificial entity, in near real-time. For example, the user may converse with the artificial entity to discuss certain topics, ask queries, and the like.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1A illustrates a network environment implementing a conversation system, in accordance with an embodiment of the present subject matter.

Figure 1B:
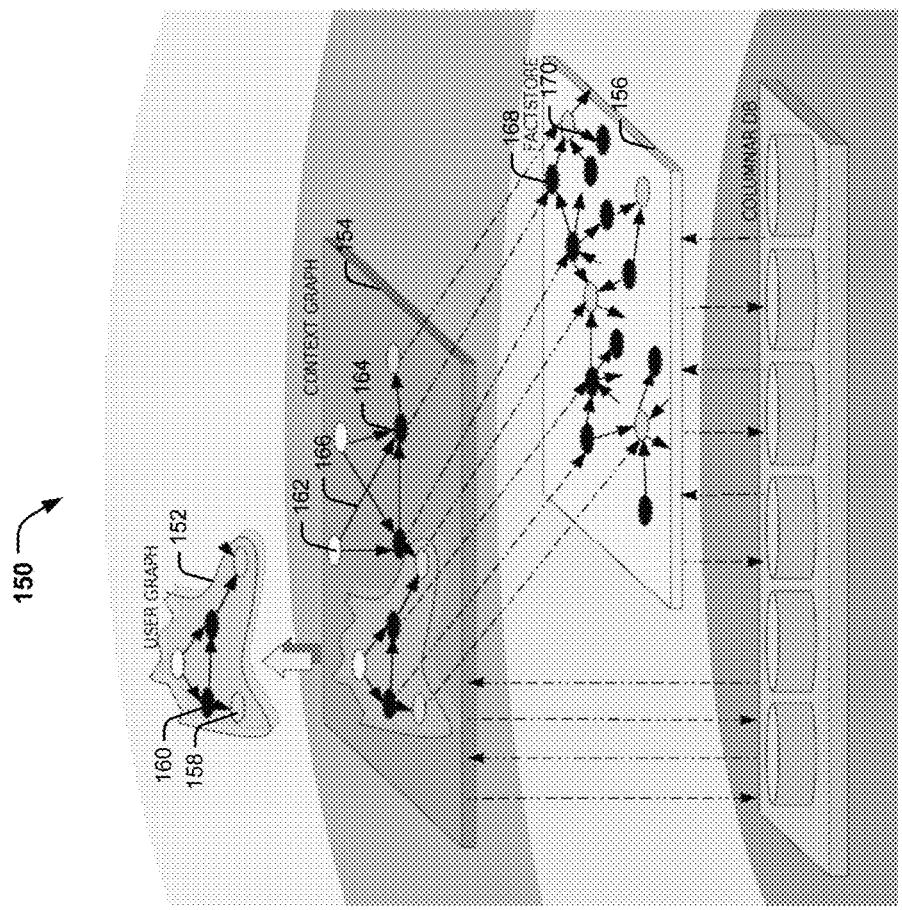
FIG. 1B illustrates a data storage architecture being employed by the conversation system, in accordance with an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

DESCRIPTION OF EMBODIMENTS

The present subject matter relates to systems and methods for providing context based conversation. A conversation system may be understood as a computer system that may be intended to converse with a human, with a coherent structure.

Textual conversations, chats, forums, blog entries, and the like are increasingly prevalent on the Internet. Enterprises employ conversation systems to communicate with the users either textually or verbally. Some of the existing conversation systems perform a database lookup and generate automated responses for customer enquiries. On the other hand, some of the conversation systems rely on keyword-matching techniques to retrieve an answer to the queries. However, such approaches may limit the interpretation capability of the conversation systems. For example, if a user queries about a fact differently than what is existing in the knowledge base, the existing conversation systems may not be able to retrieve the desired response In an attempt to interpret implied meaning of a user utterance, some conversation systems implement a rule-based approach. In an example, conversation systems may also implement a pre-configured training set, such as a dictionary that may include a broad range of input expressions for semantic analysis. However, the semantic meaning of a conversation is determined solely based on the meaning of individual words in an utterance. The existing conversation systems do not consider context of the conversation.

Some of the conversation systems have attempted to identify a context of a user utterance. Such conversation systems derive inference about context based on certain pre-defined non-contextual attributes in a knowledge base. For example, in the medical domain, if a user says "my 5 year old son has fever, vomiting, and diarrhoea," then the conversation system may identify the non-contextual attributes 'fever', 'vomiting', 'diarrhoea' and combine the con-contextual attributes with a fact derived from the conversation that "the patient is a toddler". Therefore, the conversation system may derive a contextual inference that "the patient has flu", based on a pre-configured rule set. However, such conversation systems do not capture conversation history of the users and interpret user's intent based purely on a command or request. This may be inconvenient and may provide inaccurate recommendations.

Accordingly, the present subject matter provides context based conversations. The present subject matter may include a context based conversation system, hereinafter referred to as system. The conversation system may facilitate users to have near real time text based conversation. The conversations may include context enabled discussions, learning, and unlearning. In an example, conversations with the system may include discussions, teachings of facts, and removal of previously taught facts from the system, based on the context of conversation. In an implementation, the system may provide restricted access to the data repository, depending upon a role associated with the user. For example, the user may a registered user, a guest user, or an administrator. In order to access the system, the user has to provide login credentials, such as a login ID and a password.

In an implementation, the data repository may be represented as a weighted multi-layered graph comprising the user graph layer, based on a context graph layer, which may further be based on the factstore layer and a backend database layer, wherein such a backend database layer may further comprise columnar data storage, for example, HBase. Each of these layers may represent the data as nodes and edges wherein the nodes represent the real-world entities and edges represent the relationship between such nodes. Further, the factstore layer may comprise fact nodes representing data or facts or factual information pertaining to the Enterprise, the context graph layer and the user graph layers may comprise data nodes representing the data/facts being discussed/taught by the users and the user nodes representing the user information. Further, it is to be noted here that the terminologies fact and data have been used interchangeably throughout the detailed description, representing the factual information discussed/taught/stored during the conversation.

Once the user (registered user/administrator) logs into the system, the system may generate a user graph of the user based on a context graph. In an example, the context graph may include all user conversation (discussion, learning and unlearning) related data/fact, historic and current. The context graph thus enables the system to capture and retain the context of the user conversations. The user graph may include information pertaining to active users till the users are logged in to the system such as the user conversation data, and metadata including the temporal data and the user persona data. The creation of user persona has been explained in the subsequent sections. Thus, the user graph may include user nodes representing the active users and data nodes representing the information being conversed. Further, the user graph may include relationships between each user node and data node and the relationships between the data nodes. Such information may facilitate the system to perform context-enabled conversations with the user.

Upon accessing the system, the user may provide a text input to converse with the system. In an implementation, the text input may be in natural language. To convert the text input from the natural language to a functional language, the system may parse the text input received from the user. For example, the system may perform named entity recognition on the text input to locate and classify elements in the input text in pre-defined entity categories, such as names of persons, organizations, locations, monetary values, and quantities. Further, the system may perform Part-Of-Speech (POS) tagging in which a part of speech is assigned to each word in the text input. For example, the words indicating grammatical functions, such as a noun, a verb, and an adjective are tagged in POS tagging.

Thereafter, the system may generate an expression based on the POS tagging. In an implementation, the system may generate separate expressions for discussions and learning. For example, for discussion, the system may generate an execute expression and for learning the system may generate an SVP expression. The expressions may be generated based on the POS tagging for the sentence. For example, discussion and learning statements may have different POS patterns that may be stored in a pattern bank. The pattern bank may be understood as a repository for mapping the POS patterns to corresponding expression. In an implementation, each POS pattern may be mapped to a single execute or SVP expression.

Further, the system may, upon creating the expression, process the expression to provide a desired response to the user. In an implementation, based on the expression, the system may process the expression differently. For example, in case the expression is in the form of a regular expression, the system may converse with the user based on a pre-defined rule set. In case the user queries factual information or discusses facts with the system, the system may extract the facts from the user graph, or a factstore to share with the user. In this case, the system may obtain the nodes corresponding to the text input and a relationship between the nodes, determine a query from the execute expression, identify a domain of the query from the user graph or factstore and metadata associated with the user. The user graph may include historical conversation data corresponding to a user, factstore may include the factual information pertaining to the enterprise, and the metadata may include information regarding the temporal data and the user persona data.

Thus, the system retrieves at least a response for the text input. Further, the system computes a confidence score to determine the relevance of the response to the query posed by the user based on the context of the conversation. In one example, the computation of confidence score may be based on a plurality of parameters, such as named entity recognition (NER) score, source of a fact, frequency of a fact, fact confidence, and association with other entities taught/discussed recently by the user, thus determining the context of the User conversation, and accordingly provide the response to the user, thus avoiding multiple/ambiguous responses to a single user query.

Furthermore, when the user wishes to teach a fact to the system, the system may first store the fact in the user graph and eventually push the fact to the factstore. In an implementation, the system may validate the facts being taught by the user before moving the facts from the user graph into the factstore. In an example, the system may compute a confidence score for being assigned to each fact being taught. In an example, the computation of the confidence score is based on a plurality of parameters, such as a source of a fact, frequency of a fact, fact confidence, credibility of a user, and association with other entities previously discussed/taught by a user. When the confidence score associated with a fact is above a pre-defined threshold value, the fact is moved to the factstore. In an example, the administrator may directly store the facts to the factstore, thereby rapidly expanding the factstore.

In an implementation, based on the conversations, the system may generate a user persona. In an example, based on the analysis of the discussions and teachings/unteaching of the user, the system may determine interests of the users. Accordingly, the user persona is indicative of the interests of the users. For example, the system may cluster users with similar interests, based on their previous discussions. In the present implementation, the system may arrive at inferences based on the facts discussed or taught by users to generate the user persona.

Based on the facts taught/discussed by the user, the system may retrieve responses during later conversations with the system and provide the same to the user. In case the system is not able to retrieve any response for the user query, the system may accordingly inform the user. The system may also capture context of the conversation based on semantic analysis by baseform mapping. In an example, the baseform is indicative of a synonym of a particular relationship existing in the factstore. Each baseform may have a plurality of synonyms attached as a property to a particular relationship. The baseform, therefore, facilitates retrieval of relevant responses even when the fact is queried in multiple ways.

Further, as mentioned above, the user graph may capture all facts discussed or taught by the user, the system is dependent on these facts while responding to user queries. At later stages, there may be instances when the facts may change or may become irrelevant. Accordingly, the system facilitates the users to remove such facts from the system through an unlearning service. The unlearning service facilitates the users to delete or modify such facts from the user graph.

Accordingly, the context based conversation system of the present subject matter provides near real-time text-based conversations to users. The system receives text input from the user to provide a response based on the context of the text input. The system provides the response based on the conversation history that may be stored in a database. The system further provides a push-pull mechanism enabling the users to teach or push facts in the factstore and based on the queries, retrieve or pull the facts, based on the context of the conversation. The system may facilitate validation of facts before pushing them to factstore by computation of a confidence score. In addition, the system captures context of the conversation by using a semantic analysis by baseform mapping. This enables related queries to be responded efficiently.

While aspects of described system(s) and method(s) of providing context based conversations can be implemented in any number of different computing devices, environments, and/or configurations, the implementations are described in the context of the following example system(s) and method(s).

FIG. 1A illustrates a network environment 100 implementing a conversation system 102 for providing context based conversations to a user, according to an example of the present subject matter. The conversation system 102 may be implemented as, but is not limited to, desktop computers, hand-held devices, laptops, or other portable computers, tablet computers, and the like. The network environment 100, apart from the conversation system 102, includes one or more computing devices 104-1, 104-2, . . . , 104-N. For the purpose of explanation and clarity, the computing devices 104-1, 104-2, . . . , 104-N, are hereinafter collectively referred to as computing devices 104 and hereinafter individually referred to computing device 104. In the network environment 100, the conversation system 102 is connected to the computing devices 104 through a network 106.

The network 106 may be a wireless network, wired network, or a combination thereof. The network 106 can be implemented as one of the different types of networks, such as intranet, telecom network, electrical network, local area network (LAN), wide area network (WAN), Virtual Private Network (VPN), internetwork, Global Area Network (GAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, and storage devices.

Although the conversation system 102 and the computing devices 104 are shown to be connected through a network 106, it would be appreciated by those skilled in the art that the conversation system 102 and the computing devices 104 may be distributed locally or across one or more geographic locations and can be physically or logically connected to each other.

The conversation system 102 may be coupled to the computing devices 104 for various purposes. For example, the conversation system 102 may be connected to a computing device 104 to receive text input from the users. In accordance with one embodiment of the present subject matter, the conversation system 102 implements a plurality of techniques to provide a response of the text input. The implementation and functioning of the conversation system 102 to provide context based conversations is described below.

In an implementation, the conversation system 102 may be coupled to a database 108 through the network 106. Although not shown in the figure, it will be understood that the database 108 may also be directly connected to the conversation system 102. In an implementation, the database 108 may store information, such as conversation history, facts, and discussions, by various users. In an implementation, the database 108 may be provided as a columnar database and may store data in various formats, such as columns, object oriented relational tables, indexed tables. However, it will be understood that the database 108 may be provided as other types of databases, such as relational databases, operational databases, analytical databases, hierarchical databases, and distributed or network databases. Further, the database 108 may be supported on a backend bigdata storage, thereby making the database 108 scalable and capable of handling a large volume of data in real time/near real time.

The database 108 may represent knowledge base of the conversation system 102. In an example, the knowledge base in the database 108 may be represented as a weighted multi-layered graph database. It is to be understood that the graphical representation of the knowledge base is a mere elucidation of the present subject matter, and does not limit the scope of the present subject matter. A graph may include nodes and edges for joining the nodes. A node may represent a real world entity (and its associated properties), for example, John, Violin, car, Titanic, and the like. Further, an edge joining two nodes may represent relationship between the two nodes. The properties of nodes and edges can further be stored as (key, value) pairs.

In an implementation, the database 108 may store data in a layered structure. The layered structure may include a user graph, a context graph, and a factstore. The user graph may represent information pertaining to active users till the users are logged in to the conversation system 102. The user graph may include user nodes representing the active users and data nodes representing the information being conversed. Further, the user graph may include relationships between each user node and data node. The user graph facilitates the conversation system 102 to capture the context of a user conversation by preserving the facts discussed/taught by that user. Further, the facts discussed/taught recently may be given a higher weightage while retrieving responses to queries posed by the user. The user graph thus facilitates in enhancing the quality of the conversation.

Further, the context graph may include data or facts pertaining to all user conversations (discussion, learning and unlearning), historic and current. Furthermore, the factstore may represent a primary data repository including data or facts that may be moved from the context graph to the factstore. In an implementation, the facts having a confidence score above a threshold value are moved from the context graph/user graph to the factstore. More details with respect to the layered structure of the database 108 will be explained in conjunction with FIG. 2.

In one implementation, the conversation system 102 includes a processor (not shown) and modules 110 coupled to the processor. The modules 110, amongst other things, include routines, programs, objects, components, and data structures, which perform particular tasks or implement particular abstract data types. The modules 110 may also be implemented as, signal processor(s), state machine(s), logic circuitries, and/or any other device or component that manipulates signals based on operational instructions. Further, the modules 110 can be implemented by hardware, by computer-readable instructions executed by a processing unit, or by a combination thereof. In one implementation, the modules 110 include an authorization module 112, a parsing module 114, and a classification module 116.

The authorization module 112 manages the registration and/or access privilege determination once the user registers or logs into the system. For example, when a user attempts to access conversation system 102, the authorization module 112 may check access privileges of the user. The authorization module 112 verifies access privileges of the users based on a role assigned to the users. For example, the roles may include a registered user, a guest user, and an administrator. To access the conversation system 102, the user may have to provide login credentials to the authorization module 112. In an example, the user provides the login credentials through the user device 104.

The authorization module 112 may validate the login credentials of the user by comparing the login credentials provided by the user with pre-stored user details in the database 108. In an example, the user details may include details, such as a name, a password, an age, a gender, and a role of the user. Once the user registers with the conversation system 102, the user details are captured in the database 108. As mentioned above, the database 108 stores the knowledge base as a weighted multi-layered graph; a user node pertaining to a particular user is created when the user details are captured in the database 108.

If the login credentials of the user are not available in the database 108, the authorization module 112 may consider the user as the guest user. Based on the role identified for the user, the authorization module 112 may provide access to the contents, such as conversations and facts stored in the database 108. For example, the registered user may have access to all user conversation data while the guest user may have access to publically available data in the knowledge base. Further, the guest user may not have authorization to teach the facts to the conversation system 102 or unteach/unlearn any data from the conversation system 102.

When the user successfully logs into the conversation system 102, the user may converse with the conversation system 102. As mentioned above, conversing may include conducting context enabled discussions, learning, and unlearning. In an example, when the user logs in, that particular user's nodes along with data nodes and edges previously discussed or taught or untaught by the user will be lifted to the user graph from the context graph layer. Those skilled in the art would appreciate that such users may have access only to the facts discussed/taught by that particular user, and the facts available in the factstore, but not to the facts taught by other users.

In order to converse with the conversation system 102, the user may provide a text input through the computing device 104. The text input may be received by a parsing module 114. The parsing module 114 may receive the text input in natural language format. The parsing module 114 may parse the text input to convert the text input from natural language to functional language.

In an implementation, the parsing module 114 may perform a Named Entity Recognition (NER) on the text input to locate and classify elements in the input text in pre-defined entity categories, such as names of persons, organizations, locations, monetary values, and quantities. In an example, the parsing module 114 may be invoked to perform the NER, based on a pre-defined training set, such as a dictionary. In another example, the parsing module 114 may perform a statistical NER on the text input. The statistical NER may include a combination of multiple Natural Language Processing (NLP) libraries to enhance the knowledge base of the conversation system 102 by statistically determining the probability of finding an entity under a certain category, in case the entity is not found in the dictionary.

Further, the parsing module 114 may perform Part-Of-Speech (POS) tagging on the text input. The POS tagging may include assigning a part of speech to a word in the text input. For example, the words indicating grammatical functions, such as a noun, a verb, and an adjective are tagged during the POS tagging. The parsing module 114 may employ a POS tagger as per industry standards to perform efficient POS Tagging. In an example, the POS tagger may be used via a command line or may be run as a Graphical User Interface (GUI).

Thereafter, the parsing module 114 may generate a generic expression based on the POS tagged text output. In an implementation, the conversation system 102 may generate separate expressions for discussions and learning. For example, for discussion, the conversation system 102 may generate an execute expression and for learning the conversation system 102 may generate an SVP expression. Generation of the expressions is described with help of illustration at later sections of the description. In an implementation, the generation of separate expressions is primarily based on pre-defined POS patterns. Thus, the discussion and learning statements will have different POS patterns, stored in the pattern bank. It will be evident to a person skilled in the art that each POS pattern will be mapped to a single execute/SVP expression.

In an example, if a user asks a query, the system may map the POS tagging output to the corresponding execute expression, based on the pre-configured data set. In the execute expression, the first term indicates relation between different entities in the query and the second term gives triplets comprising (entity name, value, condition), of the form:

execute (relation, entity1_identifier_relation,
        entity1name, condition1, entity2_identifier_relation, entity2name,
        condition2, . . . )

wherein, relation refers to a relationship mentioned in the query (For example, Who is the director of, Where is etc.),
entity* name refers to a name of the node that is to be fetched from the database 108 (For example, Eiffel_tower, Chandrashekharan, TCS, APJ_Abdul_Kalam),
entity*_identifier_relation refers to a relation of the desired output with the entity* (For example, hasName, has Age)
condition*: refers to the mathematical relation between entity* name and entity*_identifier_relation (For example, =, >, <, etc.)

In case of learning, the parsing module 114 may generate a subject, verb, predicate (SVP) expression. The SVP expression is represented as:

SVP (entity1, interlinking_relation, entity2)

wherein, entity* refers to the nodes being taught by the user (For example, Titanic, James_Cameron etc.);
interlinking_relaion refers to the relationship between the two nodes taught by the user.

The parsing module 114 therefore provides an efficient technique for performing syntactic and semantic analysis, as multiple patterns of sentence structures may be handled with ease by the parsing module 114. In an example, sentences with same POS tagging will be mapped to the same expression, despite different semantic meaning Therefore, the parsing module 114 may impart flexibility while handling different text inputs. For example, a query in the text input 'who is the author of harry_potter' has POS tagged output as 'WP VBZ DT NN IN NN', which also maps to the query 'what is the job of Chandrashekharan'. Hence, a single execute expression may be able to handle both these queries. In an implementation, the expressions are generated using the position of a particular word in the utterance, and not the word itself. Accordingly, the generation of the expressions provide flexibility to use the same generic expression for sentences with different semantic meaning, but same syntactic form (POS tagging output).

Some of the examples of text inputs and corresponding expressions generated by the parsing module 114 are as follows:

| Text Input | Expressions | System Interpretation of Expressions |
| --- | --- | --- |
| Where is Eiffel Tower? | execute (concat(1,2),hasName,3,=); | execute(where is, hasName, eiffel_tower,=) |
| List the scientists above age 75 years | execute(concat(1,2),hasProfession,3, =,hasAge,75,>); | execute(list the, hasProfession, scientists,=,hasAge,75,>) |
| When was APJ Abdul Kalam born | execute(concat(1,2,4),hasName,3,=); | execute(when was born, hasName, APJ_Abdul_Kalam,=); |
| Eiffel Tower is in Paris | SVP(1,concat(2,3),4); | SVP(eiffel_tower,is in,Paris); |
| Eiffel Tower is located in Paris | SVP(1,concat(2,3,4),5); | SVP(eiffel_tower,is located in,Paris); |
| APJ Abdul Kalam was born in 1935 | SVP(1,concat(2,3,4),5); | SVP(APJ_Abdul_Kalam, was born in,1935); |

In an example, the expressions generated by the parsing module 114 may be based on the pre-configured data set stored in the database 108. In the present example, the above illustrated data set may be stored in the database 1108 in a separate dual-column n-row look-up table which consists of all possible expressions that can emerge in a particular domain. The expression is maintained as key-value pair, which maps the POS tagged output (text input column in the above table) to the corresponding expression (expressions column in the above table).

In an implementation, upon creation of the expression, the classification module 116 may process the expression to provide a desired response to the user. The classification module 116 may process the expression semantically as well as contextually while responding. The classification module 1116 may interact with the database 108 to achieve the desired response. In the present implementation, based on the expression, the classification module 116 may process the expression differently.

In an example, in case of regular expressions, the classification module 116 may invoke a regex service for conversing with the user based on pre-defined rule set. In an implementation, the classification module 116 may match the expression with a pre-defined regex rule set. In case a match is found for the expression, the classification module 116 may invoke a regex service. Accordingly, the classification module 116 provides casual responses to users. For example, the user may begin with greeting the conversation system 102 with Hi/Hello/How are you and the like. The classification system 116 may respond to such expressions, as Hello/Thank you/I am doing good, how are you, and the like. In an implementation, the regex service is designed as a pluggable architecture, thus imparting flexibility to enable or disable this capability on a need basis.

Further, in case the expression generated by the parsing module 114 indicates a discussion, such as a query regarding factual information, the classification module 116 may invoke a discussion service for extracting facts from the database 108. In an implementation, while responding to the user, the classification module 116 may also consider a context of the conversation based on user conversation history, temporal data, and user persona data, as may be stored in the database 108.

For example, when a user poses a query, such as, "Where is Eiffel Tower?", the parsing module 114 generates the expression "execute (concat(1,2),hasName,3,=);", which may be interpreted as "execute(Where is, hasName, Eiffel_tower,=);", as shown in Table above. The classification module 116 may fetch corresponding nodes and relation from the user graph. If the fact is already discussed by the user, the classification module 116 may directly fetch the response for the query from the user graph. The classification module 116 thereby does not have to perform a search in the entire database 108. In case the node or relation or both are not available in the user graph, the classification module 116 fetches the same from the factstore. In this scenario, the discussed nodes and relations are added to the user graph, to expand the conversation history of the user.

Consider a scenario, where the user is posing the query for the first time and the response to the query does not lie in the user graph, but in the factstore. The discussion service may identify the query from the execute expression, as may be generated by the parsing module 114, based on a baseform of the relationship ('Where is' has the Baseform "hasLocation") and node involved in the relation (Eiffel Tower). The classification module 116 may then store the retrieved response in the user graph to make the response available for further discussions by the user by creating data nodes "Eiffel_tower" and "Paris" in the user graph which map to the corresponding fact nodes in the factstore.

Further, the classification module 116 may associate various metadata properties to the data nodes and relation which will help in further analysis. The data nodes may further have the properties which may refer to the corresponding node in the factstore. The data nodes may be connected to each other by the relationship persisting in the factstore between the two corresponding fact nodes. This relationship between two data nodes may further possess the properties denoting the user discussed count, timestamp etc, to enable framing a user persona. The user persona may help in determining the context of the user discussions, based on the user conversation history. For example, the domain of the conversation may be identified based on user persona data. For instance, if the user is discussing about "the Notebook", the classification module 116 may identify whether the entity "the Notebook" is a book or a movie based on the user's previous discussions used to generate the user persona, and respond accordingly.

Furthermore, based on the retrieved responses and the metadata associated with the user, such as the user persona data and temporal data, the discussion service facilitates the classification module 116 to retrieve a relevant response to a user query by computing a confidence score. The computation of the confidence score may be based on a number of parameters, such as named entity recognition (NER) score, source of a fact, frequency of a fact, fact confidence, and association with other entities taught/discussed recently by the user. An example for computation of confidence score has been elaborated later in the description. Thus, the classification module 116 may possess the capability to disambiguate multiple responses to the user query based on the user conversation history and provide the most relevant and appropriate contextual response to the user.

Further, if the response for the user query is unavailable in the factstore, the classification module 116 may respond back to the user mentioning "The system is unable to understand your query". It is to be noted that the classification module 116 does not fetch the response for the query from the context graph to isolate one user from other user's perception of data and facts.

In an implementation, in case the expression generated by the parsing module 114 indicates a fact being taught by the user to the conversation system 102, the classification module 116 may invoke a learning service for teaching the factual information. In an example, the learning service employs a push mechanism that enables the user to teach factual information to the conversation system 102 by retaining the taught facts in the user graph or context graph and eventually pushing the input text to the factstore. The learning service may process the fact being taught by the user and retain the fact in the user graph. Subsequently, based on confidence scores associated with the fact, the fact may be moved to the factstore. Details regarding computation will be described in later portions of the description. In one implementation, the classification module 116 may also utilize temporal data and user persona data while validating facts to be stored to the Factstore.

The facts taught by the user may enhance the user persona by identifying and retaining the context of the user conversation. For example, if a user has previously taught many facts about skin care, then the user may be understood as beauty conscious, or a Doctor, and particularly a skin specialist. Such information may facilitate in updating the user's persona in the conversation system 102. During subsequent conversations, if the user discusses about herbal products, it may be assumed with certain confidence score that the user is referring to herbal products for treatment of skin ailments, and not for reducing weight or other applications.

In an example, the classification module 116 may respond in accordance to the domain or ontology in which a user is conversing. In this scenario, the classification module 116 may identify the domain of a conversation based on the expression generated by the parsing module 114. For instance, if the user teaches a fact that "my IP is 10.172.24.247", whereas user B teaches "Patents form a crucial IP asset for an organization", the classification module 116 may identify the domain of the discussed node "IP" (For User A, IP is Internet Protocol, mapped to network domain, whereas for User B, IP is Intellectual Property, mapped to legal domain), and differentiate them accordingly. In an example, the classification module 116 may employ syntactic and semantic analysis to determine the domain or ontology.

Thus, even if the same user A discusses about IP in two different contexts, the classification module 116 may be able to identify the context of the user conversation. Those skilled in the art would appreciate that the conversation system 102 may resolve ambiguity of a same entity being mapped to multiple domains, initially by the parsing, and later based on the user persona derived from the user conversation history.

It is to be noted that if the fact doesn't exist in factstore, but in the user graph of other users, the classification module 116 may be unable display those facts to the user. Only after the fact is available in factstore or the fact is taught by the user itself, the classification module 116 may provide the information to user. Such isolation of the user space further protects the context of a conversation.

Considering a scenario where the learning service may be used to identify the facts taught by the user, and retain them in the user graph or context graph. If the user wishes to teach the fact "Titanic is directed by James Cameron", the parsing module 114 may generate the SVP expression as "SVP(1, concat(2,3,4),5);", which may be interpreted as "SVP(Titanic, is directed by, James_Cameron);". Further, the learning service may first identify the nodes "Titanic" and "James Cameron", and check if the nodes exist in the factstore/user graph. In case the nodes exist in the factstore, but are not inter-linked, the classification module 116 may create two data nodes in user graph, along with their corresponding parent nodes from the factstore. Herein, the parent nodes refer to the nodes lying in the factstore related to the fact nodes by 'isA' inheritance relationship. Further, the classification module 116 may interlink the two nodes by the 'hasDirector' relationship, which is the baseform for "is directed by" obtained from the factstore. The classification module 116 may attach the data nodes to a user node (indicating the user teaching the fact) with 'hasDiscussed' relation.

Further, the classification module 116 may attach various metadata properties associated with the user persona and the taught fact to the data nodes and relations, for example timestamp, discussed count and so on. Furthermore, the classification module 116 may attach a confidence score as a property associated with each fact indicating a confidence of the fact stated by the user. For example, if the user says "Sachin lives in Mumbai", the fact confidence may be 100%, whereas if the user says "Sachin might be living in Mumbai", the fact confidence may be 50%, which is determined based on a predefined training set. This fact confidence depends upon the relationship, and the corresponding fact confidence score may be associated with the relationship in the underlying baseform in the factstore. In case, the data nodes do not exist in the factstore, the learning service may prompt the classification module 116 to query back to the user asking more information about the nodes, and then stores the information to the factstore.

Further, when multiple users teach the same fact or a single user teaches a fact multiple times, the data nodes and relation will be created in the user graph along with user specific properties. When other users teach the same fact, user properties for those users will be attached to the existing data nodes and relations. When user teaches the same fact multiple times, the timestamp and count properties will be updated in the user graph, which will enhance the confidence of the fact.

In one implementation, the administrator may be given privilege to insert facts directly into the factstore. In such a case, the factstore may expand rapidly and may be configured based on the requirements of the enterprise. In an example, the administrator may insert the facts in the factstore in a dynamic mode and a scheduled mode. In the dynamic mode, the administrator may directly type-in the information and the parsing module 114 may process the text using NLP techniques. In the scheduled mode, the parsing module 114 may processes data from text files, in different layers of storage, before entering the factstore. The three layers of storage may include a raw store, an intermediate store, and a fact store.

In the scheduled mode, the classification module 116 may directly put text into the raw store in the raw form. All the sentences in one paragraph will be connected using a 'nextSentence' relation. From the raw store, each sentence may be broken down into smaller components. The classification module 116 may retrieve the NER and POS tagging of the sentences in the text and may create alternative ways of analyzing the sentence, by means of the NER combinations identified for a single sentence. These alternate forms for the sentence are stored in the intermediate store. Each identified NER in the alternate from will be stored as a node and the literals between two entities will be stored as a relation string in the intermediate store. Thereafter, data from the intermediate store may processed to identify the domain related information, baseforms and facts. The gathered facts are stored in the factstore and relations are established between the facts identified.

As mentioned earlier, user interaction history with the conversation system 102 may be stored in the user graph thereby enabling capturing context of the user conversations for the responses to the user. All the facts discussed or taught by the user forms a part of the user graph. There may be instances when some facts may become irrelevant or may get changed over a period of time. As such facts are persisted in the user graph; the classification module 116 may rely on them while framing the responses to the user. Therefore, the conversation system 102 facilitates the users to delete or modify a fact from the user graph, to update his persona.

In an implementation, when the user wishes to modify or delete a fact, the classification module 116 may invoke an unlearning service. The unlearning service provides a list of all previously taught facts by the user. The user may choose to delete redundant or irrelevant fact(s) from his user graph. When a fact is deleted, the classification module 116 may update properties associated with the fact to reflect the corresponding change. When the user requests to delete an entry in the user graph, the classification module 116 may initially check if the data has entered the factstore or not. In case the data is in the factstore, the "User_hasDiscussed" property will be set to false for that particular user. In case the data is still not a part of the factstore and no other users have taught the same fact, at least the data node and the relationship taught may be deleted from that particular user's user graph. In case, other users have also taught the same fact, then the "User_hasDiscussed" property will be set to false for that particular user, and the same will be deleted from the user graph of that particular user, but the data nodes and the corresponding relationship will exist in the context graph for other users.

For example, suppose the user U1 selects to unlearn the fact previously taught by him "Sam is the sister of Emily". The classification module 116 may initially verify if the fact has entered the factstore or not. In case the fact is already in the factstore, the "User_hasDiscussed" property will be set to false. In case the fact has not entered the factstore, and not been discussed by other users, then the classification module 116 may delete corresponding data nodes, relationships, and properties pertaining to the user attached to the data node-relationship from the user graph or the context graph.

Accordingly, the conversation system 102 as per the present subject matter facilitates in providing near real-time text based conversations. The conversation system 102 is associated with the layered database 108 containing the user graph 152, the context graph 154, and the factstore 156. The layered database 108 facilitates in providing the response to user queries without accessing the factstore 156 each time. Further, the conversation system 102 enables association of confidence scores with the facts that are being taught by the users, thereby ensuring that the storage space is utilized for relevant and correct facts. The conversation system 102 also enables removing irrelevant facts to optimally utilize the storage space.

FIG. 1B illustrates data storage architecture 150 by the conversation system 102, in accordance with an implementation of the present subject matter. The data storage architecture 150 may include a user graph 152, a context graph 154, and a factstore 156. The user graph 152 is the top-most layer in the data storage architecture 150. The user graph 152 is dynamic in nature and holds information regarding active users in readily available state till the user is logged in. In an example, the user graph 152 may reflect the updates or changes in real-time. The changes or updates may be based on the facts being discussed/taught by the users that are currently logged into the conversation system 102. Such updates or changes are subsequently reflected in the context graph 154. The user graph 152 represents the conversation data of the users who are currently logged into the conversation system 102. In an implementation, the user graph may include user nodes 158, data nodes 160, and corresponding relationships discussed or taught by the users who are currently active in the conversation system 102.

Further, the user graph 152 may possess a plurality of characteristics. For example, the user graph 152 facilitates temporal prioritization. As a result, the facts most recently discussed or taught by the user are considered more relevant to a conversation. The user graph 152 facilitates faster retrieval of previously discussed factual information discussed or taught by active users.

In an implementation, the data storage architecture 150 may include the context graph 154 as an intermediate data storage layer. The context graph 154 may include all users' conversation data (being discussed or taught or untaught by the users), metadata comprising temporal data, and user persona data for all users being registered in the conversation system 102. The context graph 154 may enable the conversation system 102 to retain user conversation history thereby enabling the conversation system 102 to identify the domain or ontology which the user is referring to in a conversation with a timestamp (temporal prioritization). Further, the context graph 154 enables the conversation system 102 to disambiguate multiple user responses based on the user conversation history.

The context graph 154 may include user nodes 162, data nodes 164, and corresponding relationships 166 (discussed or taught by these users). The user nodes 162 represent the information regarding the users registered in the conversation system 102. These user nodes 162 may include properties associated with them, such as User ID, name, and role, which have been created during the registration of a user. The data nodes 164 in the context graph 154 are the nodes pointing to the corresponding fact nodes in the factstore 156 by a reference ID. These data nodes 164 may include properties associated with them, such as name, ID, reference ID, and discussion Count. The relationship 166 between the user node 162 and the data node 164 is 'hasDiscussed' relationship with a timestamp at which the data node 164 is discussed, and the count property represents the number of times that particular data node 164 has been discussed by this user. The relationship 166 between two data nodes 164 is based on the relationship as may be stored in the factstore 156, or what is taught by the user. In addition, the properties associated with the user nodes 162 may represent the information regarding the users who discussed these data nodes 164, number of times the relationship was discussed, availability in factstore, and other information.

The context graph 154 may capture and retain the context of a user conversation based on the historic data pertaining to that particular user. For instance, if user U1 has discussed about Harry Potter as a Movie and user U2 has discussed about Harry Potter as a Book, then these users will be answered accordingly based on the context of previous discussions. The history of user conversation is stored in the context graph 154. Whenever the user logs into the conversation system 102, the information related to the user is moved to the user graph 152 to support contextual conversation with the user.

In an implementation, the data storage architecture 150 may include the factstore 156 as a bottom most data storage layer. The factstore 156 may include fact nodes 168 and their relationships 170, representing factual information. The factual information learnt by the conversation system 102 through the learning service are persisted to the factstore 156, based on the confidence of the facts. These facts may be retrieved by a user if he is authorized to view the facts.

In one implementation, the relationships 170 in the factstore 156 may be defined using the baseform of the relation. The baseform of the relationships 170 may facilitate in performing semantic analysis of data. The baseform may be defined at a parent node level. A parent node may refer to a node lying in the factstore 156 or the context graph 154 or the user graph 152 and is related to the fact or data or user nodes by 'isA' inheritance relationship. Each baseform may have a number of synonyms, attached as a property to that particular relationship to enable the classification module 116 to retrieve the relevant results even when a fact is queried in multiple ways. For instance, the synonyms for "hasProfession" relationship may include, but not limited to, 'is the profession of', 'who is', 'currently serving as the', 'might be a former', 'was a renowned' and so on. Each of these synonyms has a confidence score associated with them, which may be used to calculate the fact confidence. For instance, the synonym "is the profession of" may have 100% confidence, whereas "might be a former" may have 50% confidence. This confidence is further based on a predefined rule set. Thus, the queries "Who is Serena Williams?", "What is the profession of Serena Williams", and the fact "Serena Williams was a renowned Tennis Player", etc. will point to the same baseform "hasProfession".

As the classification module 116 does not solely rely on exact query formation for retrieval of factual information, at the factstore 156, the baseform mapping may enable to capture the intent behind the conversation, and makes the classification module 116 respond accordingly to the user query. In an implementation, the factstore 156 and the context graph 154 (and thus the user graph 152) can further be based on the database 108 that may be a columnar database storing large volumes of data (e.g.: in terabytes, petabytes etc.).

Figure 2:
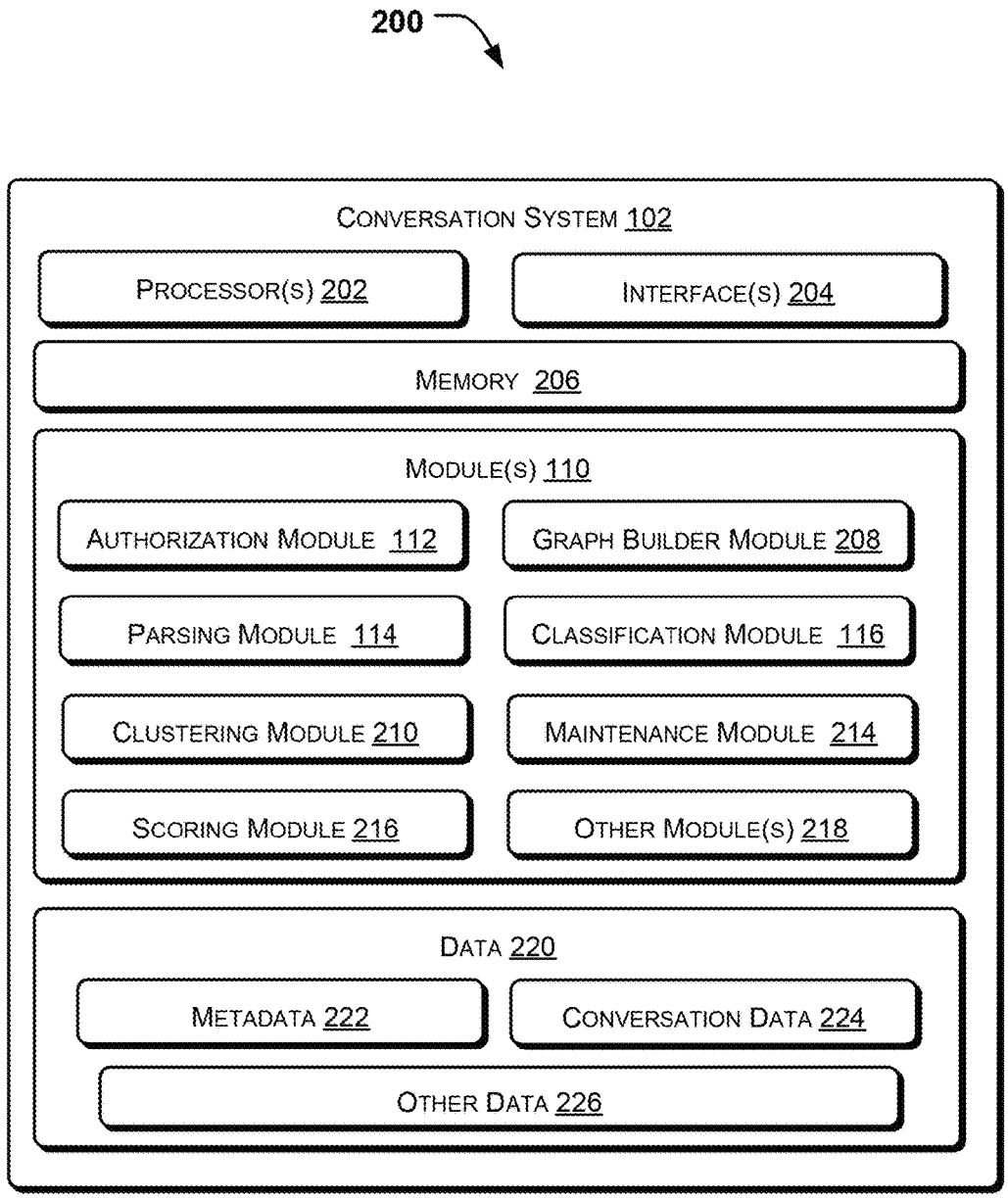
FIG. 2 illustrates the conversation system, in accordance with an implementation of the present subject matter.

FIG. 2 illustrates a schematic view 200 of the conversation system 102, in accordance with an implementation of the present subject matter. In one implementation, the conversation system 102 includes one or more processor(s) 202, interface(s) 204, and a memory 206, coupled to the processor(s) 202. The processor(s) 202 can be a single processing unit or a number of units, all of which could include multiple computing units. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions and data stored in the memory 206.

Further, the interface(s) 204 may include a variety of software and hardware interfaces, for example, interfaces for peripheral device(s), such as a product board, a mouse, an external memory, and a printer. Additionally, the interface(s) 204 may enable the conversation system 102 to communicate with other devices, such as web servers and external repositories. The interface(s) 204 may also facilitate multiple communications within a wide variety of networks and protocol types, including wired networks, for example, LAN, cable, etc., and wireless networks, such as WLAN, cellular, or satellite. For the purpose, the interface(s) 204 may include one or more ports for connecting the conversation system 102 to a number of computing devices 104. In various example implementations discussed below, the conversation system 102 communicates with the computing devices 104 via the interfaces 204.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The conversation system 102 also includes modules 110 and data 208.

The modules 116, includes the authorization module 112, the parsing module 114, the classification module 116, a graph builder module 210, a clustering module 212, a maintenance module 214, a scoring module 216, and other module(s) 218. The other module(s) 218 may include programs or coded instructions that supplement applications and functions of the conversation system 102.

On the other hand, the data 208, inter alia serves as a repository for storing data processed, received, and generated by one or more of the modules 110. The data 208 includes, for example, metadata 220, conversation data 222, and other data 224. The other data 224 includes data generated as a result of the execution of one or more modules in the other module(s) 218.

In an implementation, the authorization module 112 may be configured to check access privileges of the user. The authorization module 112 verifies access privileges of the users based on a role assigned to the users. To access the conversation system 102, the user may have to provide login credentials to the authorization module 112. The authorization module 112 may validate the login credentials of the user by comparing the login credentials provided by the user with pre-stored user details in the database 108. Based on the role identified for the user, the authorization module 112 may provide access of the contents, such as conversations and facts stored in the database 108.

Once the registered user logs into the conversation system 102, the graph builder module 210 may generate the user graph 152 for the user. In an example, the graph builder module 210 may move previous conversations data (conversation history with contextual discussion and teaching/learning) and temporal data and user persona data related to that particular user from the context graph 154 to the user graph 152, to facilitate efficient information retrieval. The graph builder module 210 builds the user graph 152 for all the users currently active in the conversation system 102.

In an implementation, when the user successfully logs into the conversation system 102, the user may converse with the conversation system 102. In order to converse with the conversation system 102, the user may provide a text input through the computing device 104. The text input may be received by the parsing module 114. The parsing module 114 may receive the text input in natural language format. The parsing module 114 may parse the text input to convert the text input from natural language to functional language. Based on the parsing, the parsing module 114 may generate a generic expression from the text input. In an example, the generic expression may be a regular expression, an execute expression, or a SVP expression.

Based on the expression, the classification module 116 may process the expression to provide a desired response to the user. The classification module 116 may process the expression semantically as well as contextually while responding. The classification module 1116 may interact with the database 108 to achieve the desired response. In an example, in case of regular expressions, the classification module 116 may invoke a regex service for conversing with the user based on pre-defined rule set.

Further, in case the expression generated by the parsing module 114 indicates a discussion, such as a query regarding factual information or some facts, the classification module 116 may invoke a discussion service for extracting facts from the database 108. When the expression generated by the parsing module 114 indicates a fact for being taught by the user to the conversation system 102, the classification module 116 may invoke a learning service for teaching the factual information. In an example, the learning service employs a push mechanism that enables the user to teach factual information to the conversation system 102 by retaining the taught facts in the user graph or context graph and eventually pushing the input text to the factstore.

In an implementation, when the user wishes to modify or delete a fact, the classification module 116 may invoke an unlearning service. The unlearning service provides a list of all previously discussed/taught facts by the user. The user may choose to delete redundant or irrelevant fact(s) from his user graph. When a fact is deleted, the classification module 116 may update properties associated with the fact to reflect the corresponding change. In an example, the classification module 116 may store the data pertaining to user conversations as conversation data 222.

In an implementation, the clustering module 212 may generate user persona based on aggregation of a plurality of user discussions. The clustering module 212 may cluster the users with similar interests, based on their previous discussions as may be stored in the context graph 154. In an example, the clustering module 212 may arrive at inferences based on the facts discussed or taught by users to frame a user persona for identification of the user interests. The user persona as generated by the clustering module 212 may be utilized while framing the responses to user.

In an implementation, the clustering module 212 may schedule performance of secondary clustering with the help of the count property captured at various levels in the context graph 154. In the present implementation, the clustering module 212 creates the user graph on the context graph. The creation is referred to as primary clustering. The clustering module 212 may be invoked by the graph builder module to create the primary clustering. In an example, secondary clustering is performed based on the aggregation of properties associated with the nodes and relationships in the user graph/context graph. In an example, the user persona may be created based on most discussed topic, i.e., how many times a data node is invoked by all user; most discussed topic by a particular user, i.e., how many times a particular user invokes a data node; and most discussed domain, i.e., how many times a particular user discusses about a particular domain.

Considering a conversation scenario involving three users U1, U2 and U3 discussing some facts in fixed time duration.

| Time | Timestamp | User | Input Text | Discussed/Taught | Comments |
|---|---|---|---|---|---|
| 18/11/14 10:00 | 1112454441 | U1 | Diabetes can be cured by Aloevera | Taught | User U1 taught the fact |
| 18/11/14 10:05 | 123445544 | U2 | Aloevera may cure Diabetes | Taught | User U2 taught the fact as U1 |
| 18/11/14 11:00 | 123879545 | | Factstore worker is scheduled | | The fact "Diabetes has Medicine Aloevera has entered the factstore by the factstore worker" |
| 18/11/14 11:30 | 124354187 | U1 | What is the cure for diabetes? | Discussed | User U1 discussed that fact that has now entered Factstore |
| 18/11/14 11:32 | 124445565 | U1 | Which disease can be cured by Aloevera? | Discussed | User U1 discussed the same fact again |
| 18/11/14 11:40 | 134578965 | U3 | What medicine is available for Diabetics | Discussed | User U3 discussed the fact |
| 18/11/14 11:45 | 145466458 | U2 | What are the symptoms of Diabetes | Discussed | User U2 discussed about Node diabetes but not the same fact |

As may be seen from the above table, the nodes Aloevera and Diabetes have been invoked 5 times, and 6 times respectively. In addition, their parent nodes Herbs and Disease are also invoked 5 and 6 times respectively. Thus, the clustering module 212 may obtain from the counts that Diabetes node has been a focus of discussion for many users. Further, the clustering module 212 determines that the users frequently discussing about a particular node. In addition, when triggered by certain business rules, the clustering module 212 may cluster such users who have common 'diabetes' node in a particular ontology.

The clustering module 212 may further generate a user Persona that may be referred to while conversations with the user, based on the user's interests and preferences. Also, the clustering module 212 may facilitate in expanding the database 108 by attaching higher confidence to the facts taught by the users belonging to the same user persona. For example, the users frequently discussing about movies may be categorized as movie persona, and such persona may further be updated dynamically based on the user conversations.

Further, the conversation system 102 may include the maintenance module 214 that may be responsible for moving the facts from the context graph 154 or user graph 152 to the factstore 156. As mentioned above, the users may teach facts to the conversation system 102 and the information is stored in the user graph 152 or the context graph 154. But these facts are not visible to other users, unless such facts are moved to the factstore 156. In order to move the facts to the factstore 156, the confidence value of the facts has to be greater than a threshold value. For example, over a period of time, when multiple users may teach the same fact, the confidence of the fact may increase, and the fact may be moved to the factstore 156 for permanent storage. Once the fact is moved to the factstore 156, the fact may be visible to all the users, thereby expanding the database 108. In an implementation, the maintenance module 212 may be scheduled to run at regular or repetitive intervals. The maintenance module 212 moves the facts to the factstore 156 based on the confidence of the fact.

As will be described later, the confidence score is calculated on every fact that is taught by the user. The facts that have a confidence score above certain threshold are moved to the factstore 156. In an implementation, the maintenance module 212 may invoke the scoring module 214 to calculate the confidence of the facts discussed/taught based on a plurality of parameters. For example, the parameters may include named entity recognition (NER) score, source of the fact, frequency of the fact, fact confidence, credibility of the user, and association with other entities previously discussed/taught by a user.

Further, when users teach new facts to the conversation system 102, nodes and relations are created separately for each user in the user graph 152. The maintenance module 212 may combine these facts before calculating confidence of these facts. In an implementation, the maintenance module 212 may combine the facts after checking the node, relation name, parent node, and at least two other properties of the facts. If the above parameters are same, the maintenance module 212 may invoke the scoring module 214 for confidence calculation after combining the properties. If confidence of the facts is above the threshold, the facts may be moved to the factstore 156.

In an implementation, the maintenance module 212 may merge the nodes and relations into a single node-relation, after moving the fact to the factstore 156. Further, the maintenance module 212 may aggregate node-relation properties before attaching the same to a single node-relation. The new nodes thus taught by the users are created in the factstore 156, along with properties, such as name and Id. These nodes are associated with their respective parent nodes by inheritance relationship. The maintenance module 212 may assign a corresponding node in the context graph 154 or the user graph 152 the reference ID to point to the parent node in the factstore 156. Also, the maintenance module 212 may set a 'hasEnteredFactstore' property to true to suggest that the fact has entered the factstore 156.

In another implementation, the context graph 154 may store facts discussed or taught by all users. As multiple users may discuss a plurality of facts over a period of time, the maintenance module 212 enables removal of older or irrelevant data from the context graph 154 for better performance of the conversation system 102. In the present implementation, the maintenance module 212 may be implemented for cleansing of data from the context graph 154 in two different modes, namely, a scheduled mode and a demand-based mode.

In the scheduled mode, the maintenance module 212 is scheduled at regular intervals to delete the data from the context graph 154. In an example, the maintenance module 212 may delete data if no user has discussed the fact for a long time or when the confidence score of a taught fact is below threshold for a long time. In the demand-based mode, the maintenance module 212 is equipped to clean the data based on time-frame mentioned by the administrator. For example, all the facts discussed before 1st Jan. 2010 can be cleansed on request.

As mentioned above, once new facts are taught by a user, the facts are moved to the context graph 154 or the user graph 152. When the confidence score of the facts is determined to be above a pre-defined threshold, the facts are moved to the factstore 156. To compute the confidence score, the scoring module 214 may employ a confidence service for calculating confidence scores for the facts. The confidence service attaches a confidence score to each fact existing in the factstore 156 or the user graph 152. In an example, the facts existing in the factstore 156 may be from different sources, such as user conversations and journals. All the facts may not be credible enough to be provided to the users. Therefore, the scoring module 214 plays a key role to pushing only the valid and relevant information to the factstore 156.

The scoring module 214 may calculate the confidence score of the facts based on different parameters. For example, the scoring module 214 may attach a credibility level to each source of information to indicate the trust level of the source. Further, each user conversing with the conversation system 102 may be provided a credibility level. In an implementation, the credibility levels to the users as well as the information sources are assigned on the basis of certain pre-defined rules. In an example, the credibility levels are assigned statically, such as a comparative weightage for each source. When facts move from the context graph 154 to the factstore 156, individual users credibility for that domain may be increased. Further, in the factstore 156, different information sources may be represented as a node attached to the 'source' parent node. In an example, the facts taught by the conversation system 102 may be represented using the source node as 'Application'. The credibility level for each information source may be represented by means of a relation 'hasCredibility' with the source node.

In an implementation, all users may be assigned a minimum credibility on registering with the conversation system 102. In an example, the minimum credibility is assigned to the users corresponding to the user role. When user logs in, a corresponding user node may be created in the user graph 152. The user node may be attached to a parent node 'user'. The scoring module 214 may attach the minimum credibility of the user with a relation 'hasCredibility' to the user node. Subsequently, when users teach different facts and they are moved to the factstore 156, credibility level of the user may increase in the domain of the fact. Accordingly, credibility of a user may vary from domain to domain. For example, user U1 may be more credible in movie domain, but not in sports domain.

In another implementation, a fact confidence may be taken into consideration to determine the confidence score for the fact being taught/discussed to the conversation system 102. The fact confidence may indicate the surety with which a fact is stated. For example, the statements 'Titanic is directed by James Cameron' and 'Titanic might be directed by James Cameron' represent different confidence levels. In the present implementation, the fact confidence is captured against the baseform. For example, phrases 'is directed by', 'might be directed by' both maps to the baseform 'hasdirector'. Each of these phrases may have the confidence property attached to them which may be expressed in percentage. Therefore, the phrases 'is directed by' represent a 100% confidence while 'might be directed by' represent a 50% confidence.

In one implementation, the scoring module 214 may be invoked by the discussion service as well as by the learning service for dynamic confidence generation. For example, when a user discusses about a fact, the classification module 116 may query the factstore 156 based on the relation and node identified from the text input. In some cases, multiple facts may satisfy the same query from user, resulting in multiple answers retrieved for the same query. For example, when the user discusses 'Who is the director of Titanic', the relation identified is 'hasDirector' and node is 'Titanic'. If multiple nodes named 'Titanic' exists in the factstore 156 multiple answers may be retrieved. All of them may not be relevant to the context in which user is discussing or with respect to the information expressed in the query.

To handle such ambiguity, all the facts may be ranked based on the confidence score. In an example, the facts below a threshold confidence score may not be shown to the users. When multiple facts exist with same confidence, most relevant answer may be identified based on the ranking. In one implementation, the scoring module 214 may include a plurality of parameters while calculating confidence score for the discussion service. The parameters may include a named entity recognition (NER) score, source of a fact, frequency of a fact, fact confidence, and association with other entities taught/discussed recently by the user. For example, different NER combinations for the input text may be given different weightage. NERs identified from a system dictionary may be given more weightage while those identified by statistical approach can be given less weightage. In an example, different combinations may yield different responses from the database 108. Hence, each of the patterns may be given different weightage depending on user's recent discussion topics.

Further, the scoring module 214 may consider a source of the fact and frequency of a fact (number of times the fact is taught/discussed) for calculating the confidence score during the discussion service. As mentioned above, the facts may be learnt by the conversation system 102 from different sources, with different credibility. As may be understood, the facts learnt from more credible sources may be having more confidence. If the same fact is learnt from different sources, source and count property for the node and relation may be updated in the factstore 156. The scoring module 214 may consider fact confidence as another parameter for computing the confidence score of the fact. The fact confidence may indicate a surety with which the fact was stated while learning.

In addition, the scoring module 214 may take into consideration association of the facts with entities previously discussed/taught by the users, while calculating the confidence score. Therefore, if the entities in a current response are related to entities in previous user discussions, such entities may be given more weightage. For example, if the user has been discussing about 'Titanic' and then he queries about 'James Cameron'. The classification module 116 may while responding to the user query may check if there are multiple persons named 'James Cameron' existing in the database 108 and the entity related to 'Titanic' may be given more weightage.

In an implementation, the confidence score is calculated as a score in 100. Each of the parameters is given weight distribution, which may be pre-configured in the system. In one of the embodiments, equal weight is given to each parameter. Considering an example for confidence calculation for the discussion service. If the user asks a query "Who is the director of Titanic? Considering there are two nodes named "Titanic" in the factstore 156 such that one belongs to Movie domain, and the other belongs to Ship domain. In addition, considering that both the nodes have "hasDirector" relationship with nodes "James Cameron" (Director of Movie Titanic) and "Lui Chang" (Captain of Ship Titanic). Both the nodes may be represented as:

Titanic->hasdirector->James Cameron (Source: Wiki, taught_count: 5, Source: Journal, Learnt count: 2, Fact Confidence: 100)

Titanic->hasdirector->Lui Chang (Source: Journal, taught_count: 1, Fact confidence: 60)

As the confidence score corresponding to the second node viz. Titanic in the ship domain is low, the classification module 116 may not process this node in response to the user query. In an example, when facts exist both in the factstore 156 as well as the user graph 152, the facts taught by the user may be given more weightage to ensure that the context in which the user has taught the fact is considered while discussing the same fact with that user.

In an example, the scoring module 214 may ensure that wrong facts are not entered into the factstore 156 from the context graph 154. For example, User A may teach "Titanic is directed by James Cameron", while User B may teach "Titanic is directed by Mark Kaplan". All the teachings may not be correct. Accordingly, the scoring module 214 may validate the facts, before moving to the facts to the factstore 156. As described above, the validity of the facts is determined by means of the plurality of parameters, such as a source of a fact, frequency of a fact, fact confidence, credibility of a user, and association with other entities previously discussed/taught by a user. These parameters in conjunction with the user persona data and temporal data may enable the scoring module 214 to determine the confidence score for a taught fact.

Further, the relationship associated with each fact may include the confidence score and other parameters such as fact confidence and taught count (number of times the fact is taught by a particular user). The fact confidence may be stored as a property against the fact relation in the format 'user_base-form_count: <confidence>'. The scoring module 214 may also estimate the number of times fact is taught by each user i.e the taught count and associate the same as a property 'user_taught_count'. Later, the maintenance module 212 may move facts above the confidence threshold from the user graph 152 or the context graph 154 to the factstore 156. In the factstore 156, the source information is attached as a property of the fact relation in the format:

'hic_graphdb_graph_element_source={"application":
"{\"1\":\"70\"}"}' wherein 'application' is the source, '1' denotes the number of times the fact has been taught by the source, and '70' denotes the confidence score of the fact. When one fact is taught multiple times, the count and confidence scores are updated, against the source, by the scoring module 214.

Similarly, the conversation system 102 may capture the credibility of the user who taught the fact as a property associated with the corresponding user node in the user graph 152. When multiple users with different credibility levels teach the same fact, the confidence score of the fact may increase. When the aggregate confidence score of the fact becomes higher than the threshold confidence score, the facts may be eligible to enter the factstore 156. Once the facts from user graph 152 may enter the factstore 156, all other users will also be able to view the fact through the discussion service.

Figure 3:
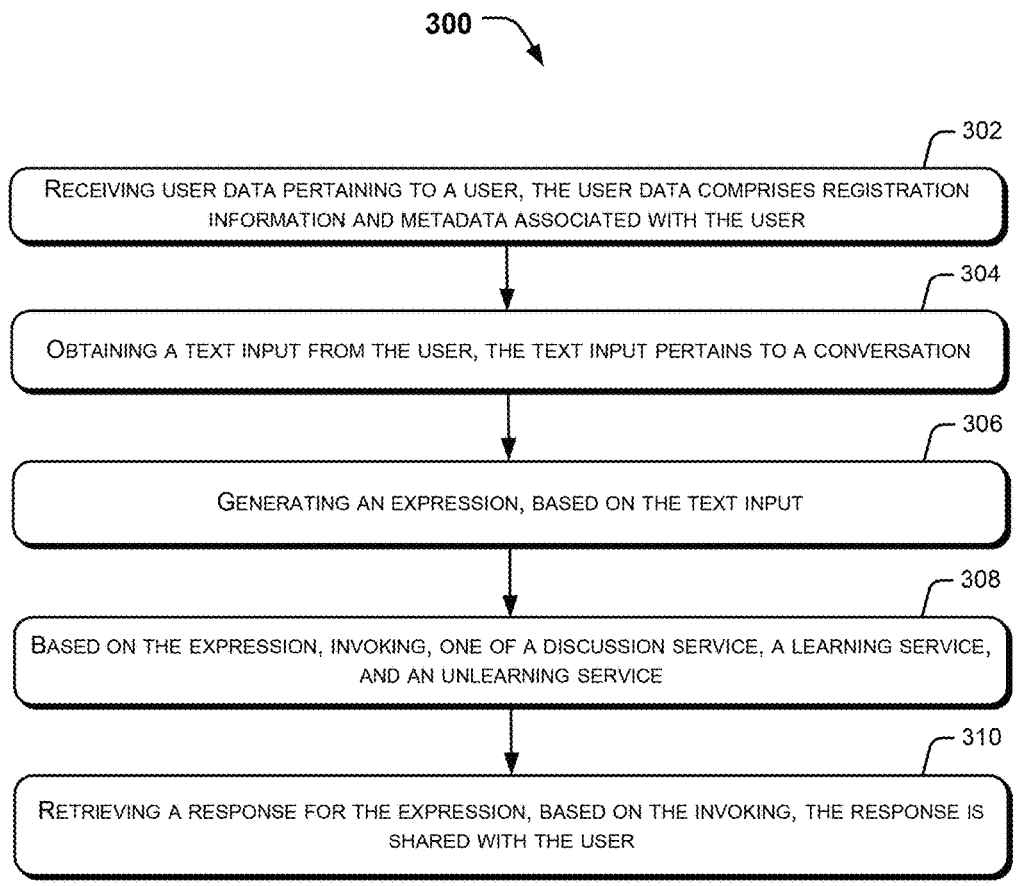
FIG. 3 illustrates a flowchart depicting a method for providing context based conversations, in accordance with an implementation of the present subject matter.
Figure 4:
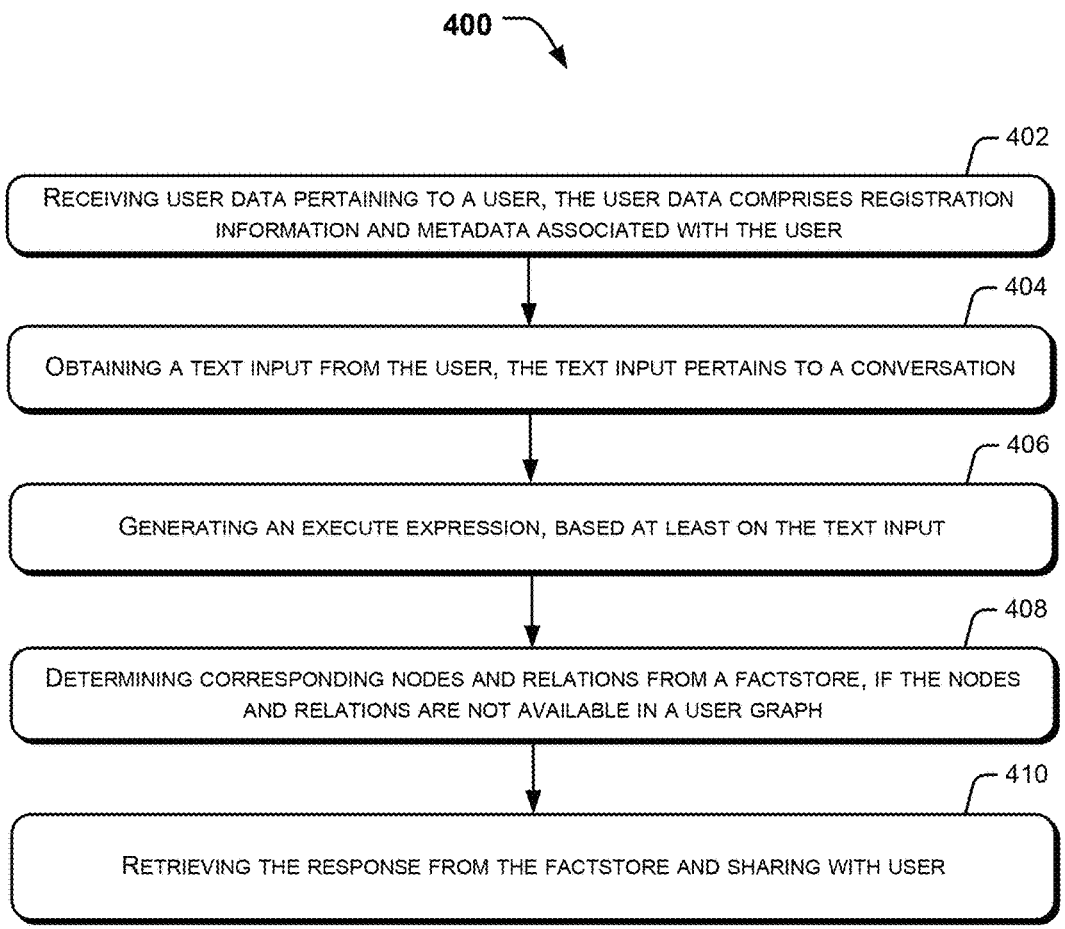
FIG. 4 illustrates a flowchart depicting a method for providing a discussion service by the conversation system, in accordance with an implementation of the present subject matter.
Figure 5:
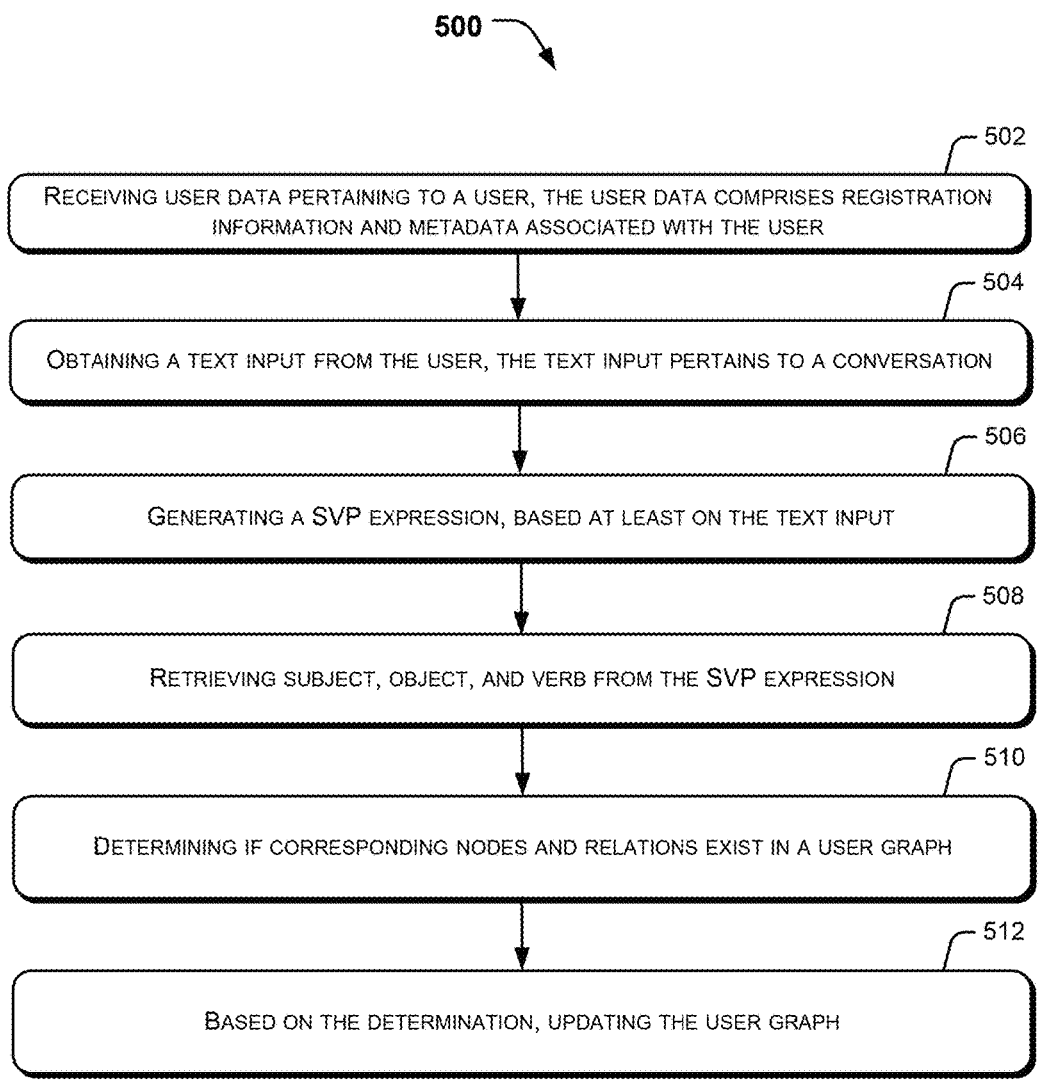
FIG. 5 illustrates a flowchart depicting a method for providing a learning service by the conversation system, in accordance with an implementation of the present subject matter.
Figure 6:
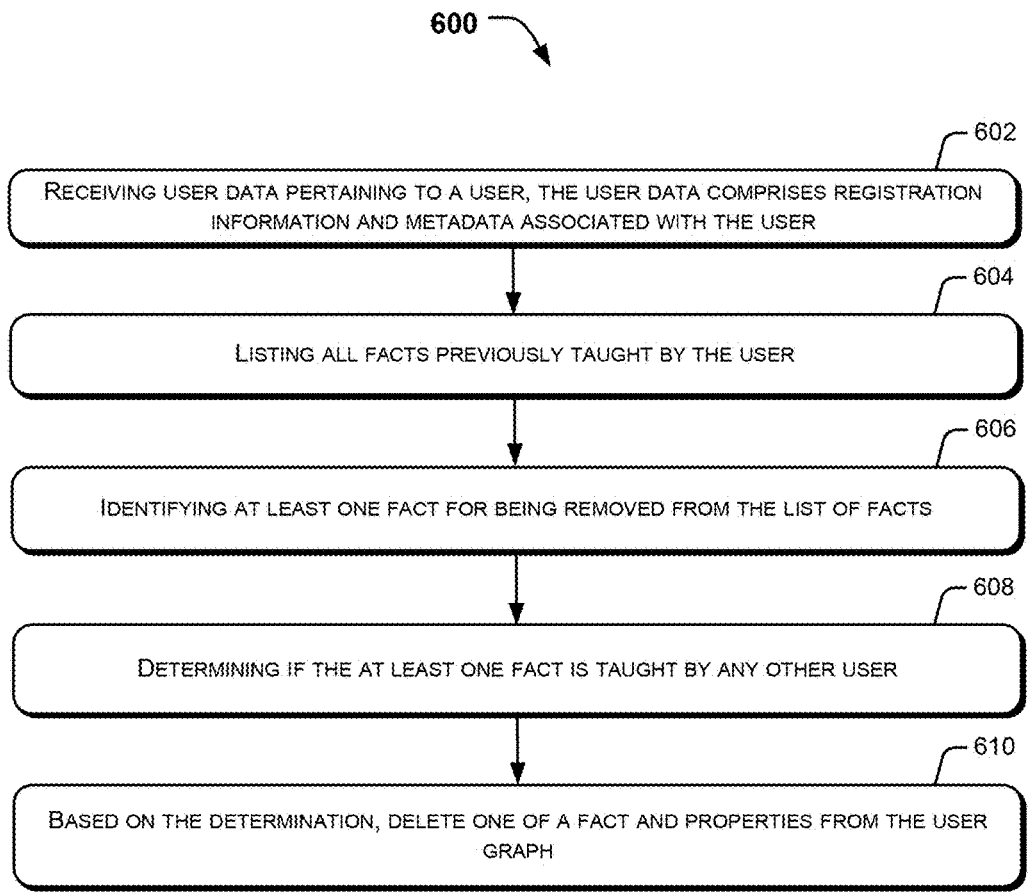
FIG. 6 illustrates a flowchart depicting a method for providing an unlearning service by the conversation system, in accordance with an implementation of the present subject matter.

FIG. 3 illustrates a method 300 for providing context based conversations to a user, according to an embodiment of the present subject matter. Further, FIG. 4 illustrates a method 400 for providing a discussion service by the conversation system 102, according to an embodiment of the present subject matter. In addition, FIG. 5 illustrates a method 500 for providing a learning service by the conversation system 102, according to an embodiment of the present subject matter. In addition, FIG. 6 illustrates a method 600 for providing an unlearning service by the conversation system 102, according to an embodiment of the present subject matter. The methods 300, 400, 500, and 600 may be described in the general context of computer executable instructions. Generally, computer executable instructions can include routines, programs, objects, components, data structures, procedures, modules, functions, etc., that perform particular functions or implement particular abstract data types. The methods 300, 400, 500, and 600 may also be practiced in a distributed computing environment where functions are performed by remote processing devices that are linked through a communications network.

The order in which the methods 300, 400, 500, and 600 are described is not intended to be construed as a limitation, and any number of the described method blocks can be combined in any order to implement the methods 300, 400, 500, and 600, or an alternative method. Furthermore, the methods 300, 400, 500, and 600 can be implemented in any suitable hardware, software, firmware or combination thereof.

At block 302, the method 300 may include receiving a user data pertaining to the user. The user data may include registration information and metadata associated with the user. In an implementation, the authorization module 112 may receive the user data, when the user attempts to access the conversation system 102. The registration information may include a name, a password, an age, a gender, and the like. Further, the metadata may include temporal data and user persona.

Further, at block 304, the method 300 may include obtaining a text input from the user. The text input may pertain to a conversation. In an implementation, the text input may be obtained by the parsing module 114. In an example, the input text may in natural language format.

At block 306, the method 300 may include generating an expression, based on the text input. In an implementation, the parsing module 114 may generate an expression from the text input. In an example, the parsing module 114 may perform named entity recognition and part of speech tagging, to generate the expression from the text input.

At block 308, the method 300 may include based on the expression, invoking one of a discussion service, a learning service, and an unlearning service. In an implementation, the classification module 116 may determine the type of the expression and accordingly invoke one of the discussion service, the learning service, and the unlearning service. In an example, when the expression is an execute expression, the classification module 116 may invoke the discussion service. In another example, when the expression is an SVP expression, the classification module 116 may invoke the learning service.

Further, at block 310, the method 300 may include retrieving a response for the expression, based on at least the invoking and the metadata associated with the user. The retrieved response is shared with the user. In an implementation, the classification module 116 may retrieve the response and share the response with the user. In an example, when the user asks a query, the classification module 116 may invoke the discussion service and retrieve the response from the database 108.

Referring to FIG. 4, at block 402, the method 400 may include receiving a user data pertaining to the user. The user data may include registration information and metadata associated with the user. In an implementation, the authorization module 112 may receive the user data, when the user attempts to access the conversation system 102. The registration information may include a name, a password, an age, a gender, and the like. Further, the metadata may include temporal data and user persona.

Further, at block 404, the method 400 may include obtaining a text input from the user. The text input may pertain to a conversation. In an implementation, the text input may be obtained by the parsing module 114. In an example, the input text may in natural language format.

At block 406, the method 400 may include generating an execute expression, based on the text input. In an implementation, the parsing module 114 may generate the execute expression from the text input. In an example, the parsing module 114 may perform named entity recognition and part of speech tagging, to generate the execute expression from the text input.

At block 408, the method 400 may include determining corresponding nodes and relations from a factstore 156, if the nodes and relations are not available in a user graph 152. In an implementation, the classification module 116 may determine the corresponding nodes and relations from the factstore 156. In an example, the nodes may relate to user nodes or data nodes. In case the user has not discussed the fact earlier, the nodes will not be present in the user's user graph 152. In such a scenario, the classification module 116 may look for the nodes and relations in the factstore 156.

At block 410, the method 400 may include retrieving the response from the factstore 156 and sharing the response with the user. In an implementation, the classification module 116 may retrieve the response for the user query from the factstore 156.

Now referring to FIG. 5, at block 502, the method 500 may include receiving a user data pertaining to the user. The user data may include registration information and metadata associated with the user. In an implementation, the authorization module 112 may receive the user data, when the user attempts to access the conversation system 102. The registration information may include a name, a password, an age, a gender, and the like. Further, the metadata may include temporal data and user persona.

Further, at block 504, the method 500 may include obtaining a text input from the user. The text input may pertain to a conversation. In an implementation, the text input may be obtained by the parsing module 114. In an example, the input text may in natural language format.

At block 506, the method 500 may include generating an SVP expression, based on the text input. In an implementation, the parsing module 114 may generate the SVP expression from the text input. In an example, the parsing module 114 may perform named entity recognition and part of speech tagging, to generate the execute expression from the text input.

At block 508, the method 500 may include retrieving a subject, object and verb from the SVP expression. In an implementation, the classification module 116 may retrieve a starting node (subject), an end node (object), and a relation (verb) from the SVP expression.

Further, at block 510, the method 500 may include determining if corresponding nodes and relations exist in the user graph 152. In an implementation, the classification module 116 may, upon determination of the subject, object, and verb, determine whether corresponding nodes and relations exist in the user graph 152.

At block 512, the method 500 may include updating the user graph 152, based on the determination. In an implementation, if the nodes and relations do not exist in the user graph 152, the classification module 116 may create new nodes and relations in the user graph 152, based on the input text. In case, if the nodes and relations exist in the user graph 152, the classification module 116 may either create new relation for the same user node or may create new nodes and relations for new facts being taught by the user.

Referring to FIG. 6, at block 602, the method 500 may include receiving a user data pertaining to the user. The user data may include registration information and metadata associated with the user. In an implementation, the authorization module 112 may receive the user data, when the user attempts to access the conversation system 102. The registration information may include a name, a password, an age, a gender, and the like. Further, the metadata may include temporal data and user persona.

At block 604, the method 600 may include listing all facts previously taught by the user. In an implementation, the classification module 116 may invoke an unlearning service to provide a list of all the facts previously taught/discussed by the user.

At block 606, the method 600 may include identifying at least one fact for being removed from the list of facts. In an implementation, the user may select the at least one fact for being removed.

At block 608, the method 600 may include determining if the at least one fact is taught by any other user. In an implementation, the classification module 116 may determine if the at least one fact is taught by any other user.

Further, at block 610, the method 600 may include deleting one of a fact and properties from the user graph 152, based on the determination. In an implementation, if the at least one fact is taught by a single user, the classification module 116 may delete the fact, i.e., nodes and relations, from the user graph 152. On the other hand, if the at least one fact is taught by more than one user, the classification module 116 may delete the user specific properties from the fact in the user graph 152.

Although embodiments for methods and systems for context based conversations have been described in a language specific to structural features and/or methods, it is to be understood that the present subject matter is not necessarily limited to the specific features or methods described. Rather, the specific features and methods are disclosed as exemplary embodiments for context based conversations.

We claim:

1. A method for providing context based conversations, the method comprising:

receiving, by a processor, user data pertaining to a user, wherein the user data comprises registration information of the user and metadata associated with the user;

determining, by the processor, a role of the user, wherein the role of the user is pre-defined based on the registration information, and corresponds to one of a registered user, a guest user, and an administrator;

providing, by the processor, restricted access to a users' data repository to the user upon ascertaining access privilege of the user based on the role pre-defined for the user;

obtaining, by the processor, a text input from the user, wherein the text input pertains to a conversation;

generating, by the processor, an expression, based on the text input, wherein the expression is processed semantically and contextually upon generating the expression, wherein the expression is generated using a position of a particular word in the text input; and wherein the generated expression provides flexibility to use the same expression for text inputs with different semantic meaning but same syntactic form;

invoking, by the processor, one of a discussion service, a learning service, and an unlearning service, based on the expression and the metadata associated with the user; and retrieving a response, by the processor, based on at least one of the invoked services, and the metadata associated with the user, wherein the response is shared with the user, obtaining, by the processor, conversation data from the discussion service, the learning service, the unlearning service, the metadata associated with the user, user persona data for registered users to be included in a context graph, wherein the context graph enables a conversation system to retain a conversation history that aids in identifying a domain of the conversation with a timestamp.

2. The method as claimed in claim 1, wherein the expression is generated by the processor by parsing, to convert a natural language into a functional language.

3. The method as claimed in claim 1 further comprising classifying, by the processor, the expression into one of a discussion, learning, and unlearning.

4. The method as claimed in claim 3, wherein the expression is classified as the discussion when the expression is an execute expression, and wherein the classification of the expression as discussion comprises:

obtaining nodes corresponding to the text input and a relationship between the nodes from the execute expression;

determining a query from at least the obtained nodes and relationship, based on a baseform of the relationship;

identifying a domain of the query based on at least the user graph, factstore and metadata associated with the user, wherein the user graph comprises historical conversation data corresponding to a user, factstore comprises Enterprise factual data, and the metadata comprises information regarding the temporal data and the user persona data, wherein the user persona is based on aggregation of a plurality of historic and current user conversations, further indicating the interests of the user;

based on the domain of the query, retrieving at least a response for the text input;

computing the confidence score for the at least one response, wherein the computation is based on a plurality of parameters, determining the context of the discussion and the relevance of the response to the query; and providing the response to the user when the confidence score of the at least one response is above a pre-defined threshold value.

5. The method as claimed in claim 3, wherein the expression is classified as learning when the expression is a Subject Verb Predicate (SVP) expression, and wherein the classification of the expression as learning comprises:

retrieving at least one fact from the SVP expression, comprising at least two nodes and a relationship between these nodes, wherein the fact is being taught by the user;

storing the fact in the user graph, wherein the user graph comprises a user node, and the at least two retrieved nodes and the retrieved relationship between these nodes;

computing a confidence score for the at least one fact, wherein the computation is based on a plurality of parameters, determining the context of learning and validity of the fact thereof; and storing the fact in a factstore when the confidence score of the at least one fact is above a pre-defined threshold value.

6. The method as claimed in claim 5, wherein the plurality of parameters comprise a source of a fact, frequency of a fact, fact confidence, credibility of a user, and association with other entities previously discussed/taught by a user.

7. The method as claimed in claim 5, wherein the at least one fact is directly stored in the factstore by employing one of a dynamic mode and a scheduled mode.

8. The method as claimed in claim 1, wherein the learning service is performed as bulk learning at pre-defined time intervals.

9. The method as claimed in claim 3, wherein the unlearning comprises:

obtaining a list of previously taught facts from a user graph;

receiving a selection of at least one fact for being deleted from the user graph, wherein the at least one fact is one of incorrect, redundant, and irrelevant; and deleting the at least one fact from the user graph.

10. The method as claimed in claim 9, wherein the deleting comprises:

determining that the fact is pending for storage in the factstore;

upon determining, confirming whether the fact is taught by a single user; and deleting at least a data node representing the fact and a relationship of the data node with the single user from the user graph.

11. The method as claimed in claim 9, wherein the deleting comprises determining whether the fact is taught by multiple users, and updating the properties associated with the relationship of the data nodes based on the determining.

12. The method as claimed in claim 1 further comprising generating, by the processor, a user graph based on the user data, wherein the user graph comprises a user node, previously discussed/taught data nodes, and corresponding relationships, pertaining to users currently logged into a context based conversation system.

13. A context based conversation system comprising:
a processor;
an authorization module, executable by the processor, to,
receive user data from a user, wherein the user data comprises login credentials of the user and metadata associated with the user;
based on the user data, determine a role of the user, wherein the role of the user is pre-defined, and corresponds to one of a registered user, a guest user, and an administrator; and
provide restricted access to the user, based on the role pre-defined for the user upon ascertaining access privilege of the user;
a parsing module, executable by the processor, to,
receive text input from the user, wherein the text input is in natural language;
parse the text input to convert the text input from natural language to functional language;
based on the parsing, generate an expression from the text input; and
a classification module, executable by the processor, to
determine the type of expression from one of a discussion, learning, unlearning, wherein the expression is processed semantically and contextually upon determining the type of expression, wherein the expression is generated using a position of a particular word in the text input and the generated expression provides flexibility to use the same expression for text inputs with different semantic meaning but same syntactic form;
invoke, based on the determination, one of a discussion service, a learning service, and an unlearning service; and
retrieve a response based on the expression and the provide the response to the user,
obtain conversation data from the discussion service, the learning service, the unlearning service, the metadata associated with the user, user persona data for registered users to include in a context graph, wherein the context graph enables the context based conversation system to retain a conversation history that aids in identifying a domain of the conversation with a timestamp.

14. The context based conversation system as claimed in claim 13 further comprises a graph builder module, executable by the processor, to generate a user graph depicting currently active users and facts or data previously and currently discussed by such users, wherein the user graph comprises a user node, previously discussed/taught data nodes, and corresponding relationships, pertaining to users currently logged into the context based conversation system.

15. The context based conversation system as claimed in claim 13 further comprises a clustering module, executable by the processor, to generate user persona based on aggregation of a plurality of historic and current user conversations.

16. The context based conversation system as claimed in claim 13 further comprises a scoring module, executable by the processor, to compute a confidence score to each fact being entered by a user, wherein the fact is entered by the user using a discussion service and a learning service, and wherein the computation is based on a plurality of parameters and the facts having the confidence score above a threshold value are stored to a factstore.

17. The context based conversation system as claimed in claim 16, wherein, for learning service, the plurality of parameters may comprise a source of a fact, frequency of a fact, fact confidence, credibility of a user, and association with other entities taught/discussed recently by the user.

18. The context based conversation system as claimed in claim 13 further comprises a maintenance module, executable by the processor, to,
   move the facts from a user graph or the context graph to a factstore over a period of time; and
   cleanse the context graph to remove irrelevant data from the context graph.

19. The context based conversation system as claimed in claim 18, wherein the maintenance module cleanses data from the context graph in a scheduled mode and a demand-based mode.

20. A non-transitory computer readable medium embodying a program executable in a computing device, the program comprising:
   a program code for receiving user data pertaining to a user, wherein the user data comprises registration information of the user and metadata associated with the user;
   a program code for determining a role of the user, wherein the role of the user is pre-defined based on the registration information, and corresponds to one of a registered user, a guest user, and an administrator;
   a program code for providing restricted access to a users' data repository to the user upon ascertaining access privilege of the user, based on the role pre-defined for the user;
   a program code for obtaining a text input from the user, wherein the text input pertains to a conversation;
   a program code for generating an expression, based on the text input, wherein the expression is processed semantically and contextually upon generating the expression, wherein the expression is generated using a position of a particular word in the text input and wherein the generated expression provides flexibility to use the same expression for text inputs with different semantic meaning but same syntactic form;
   a program code for invoking one of a discussion service, a learning service, and an unlearning service, based on the expression and the metadata associated with the user; and
   a program code for retrieving a response, based on at least one of the invoked services, and the metadata associated with the user, wherein the response is shared with the user,
   a program code for obtaining conversation data from the discussion service, the learning service, the unlearning service, the metadata associated with the user, user persona data for registered users to be included in a context graph, wherein the context graph enables a conversation system to retain a conversation history that aids in identifying a domain of the conversation with a timestamp.

* * * * *